United States Patent
Ulrickson et al.

[11] Patent Number: 6,006,740
[45] Date of Patent: Dec. 28, 1999

[54] PORTABLE CAMPFIRE GRILL

[76] Inventors: George G. Ulrickson; George G. Ulrickson, Jr., both of 15952 Shark Rd. W., Jacksonville, Fla. 32226

[21] Appl. No.: 09/161,577

[22] Filed: Sep. 28, 1998

[51] Int. Cl.$^6$ .................................................. F24B 3/00
[52] U.S. Cl. ........................... 126/29; 126/9 R; 126/25 A
[58] Field of Search ............................ 126/29, 30, 9 R, 126/25 R, 25 A, 25 AA; 248/156, 124, 165

[56] References Cited

U.S. PATENT DOCUMENTS

| | | | |
|---|---|---|---|
| 2,827,846 | 3/1958 | Karkling | 126/30 |
| 2,849,948 | 9/1958 | Rowley | 126/30 |
| 2,977,953 | 4/1961 | Dowdy | 126/30 |
| 4,363,313 | 12/1982 | Smith | 126/30 |
| 4,437,450 | 3/1984 | Connelly | 126/30 |
| 4,589,399 | 5/1986 | Hamill | 126/30 |
| 5,117,806 | 6/1992 | Soat | 129/29 |

*Primary Examiner*—James C. Yeung
*Attorney, Agent, or Firm*—Arthur G. Yeager

[57] ABSTRACT

A portable campfire grill assembly includes a support post insertable into the ground and having a first tubular sleeve and engaging screw mountable on the post to establish the vertical height of the grill. The grill is a rectangular metal unit having a second sleeve welded thereon and mountable on the post with an engaging screw to establish the position of the grill as it is rotated around the post to be either over a fire or removed therefrom. A planar flange is welded around the post at the lower end to provide stability for the post and to provide a foot plate for driving the post into the ground. The flange fits against one end of the grill when the assembly is taken apart for ease of carrying. The support post is mounted through two loops welded to one side of the grill and secured into place using the first sleeve. The entire grill can then be carried by grasping the support post at a point between the two loops.

18 Claims, 3 Drawing Sheets

PORTABLE CAMPFIRE GRILL

CROSS REFERENCE TO RELATED APPLICATIONS

Not Applicable.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

The present invention relates to campfire grills and particularly to grills that can be disassembled for ease of carrying and portable use.

2. Description of the Related Art

There are a wide variety of portable grills adapted for use with outdoor campfires. The grills include a support post mounted on or in the ground and include various means for attaching a grill and other apparatus thereto. These grills, however, are very difficult to carry. What is desired is a grill that can readily be disassembled and easily carried, yet at the same time be simple in construction and sturdy in use. None of the prior art grills have the desired structure and characteristics.

BRIEF SUMMARY OF THE INVENTION

In one aspect of the present invention there is provided a portable campfire grill assembly comprising a support post having a first end and a second end portion, the first end portion being adapted to be inserted into the ground in a vertical manner with the second end portion being uppermost. A first sleeve member having a tubular body including an upper and lower end portion is sized to slide over the second end portion of the support post. Engaging means is mounted through the tubular body for selectively engaging the support post for fixing the position of the first sleeve member on the support post. A second sleeve member having a tubular body including an upper and lower end portion is sized to slide over the second end portion of the support post. The second engaging means is mounted through the tubular body for selectively engaging the support post for fixing the position of the second sleeve member on the support post. A planar grill member is affixed to the first sleeve member and disposed horizontally. Means is affixed to the grill member for releasably mounting the support post. When the support post is not mounted in the ground it is grippable to allow the user to carry the assembly. In other aspects of the invention the means includes a pair of spaced fasteners mounted to the grill member, each fastener being formed to fit around the support post. Each fastener includes a substantially closed hook member defining an interior generally circular passageway, the support post being cylindrical and removably insertable into the passageway of each hook member.

A generally planar support flange is affixed to the support post adjacent the lower end portion for resting against the ground and laterally supporting the support post in a vertical position. The flange is formed of a substantially square metal plate having four corners, each corner being turned downwardly in the direction of the first end portion of the support post to penetrate the surface of the ground when the support post is vertically mounted to provide for lateral support of the support post and inhibit rotary movement of the post.

The grill member is substantially rectangular in shape and includes two metal end bars and two metal side bars enclosing a metal screen, one end bar being welded to the first sleeve member. The first sleeve member is located to rest on the upper end portion of the second sleeve member and rotatable thereupon when the second engaging means is released.

A laterally extending handle is affixed to the body of the first sleeve member to assist a user in rotating the first sleeve member for selective rotating of the grill member about the support post.

In additional aspects of the invention the carrying means includes a pair of spaced fasteners mounted to the grill member, each fastener being formed to fit around the support post. Each fastener includes a substantially closed hook member including a rod element and a hook element at one end of the rod element, the hook element defining an interior generally circular passageway, the support post being removably insertable into the passageway of each hook member, the rod element having length sufficient to provide a space between the support post when carried by the hook members and the grill member for the fingers of a user carrying the grill assembly.

The grill member is substantially rectangular in shape and includes two metal end bars and two metal side bars enclosing a metal screen, one end bar being welded to the first sleeve member. The carrying means includes a pair of spaced metal loop members affixed to one side bar.

BRIEF DESCRIPTION OF THE SEVERAL VIEWS OF THE DRAWING

The novel features which are believed to be characteristic of this invention are set forth with particularly in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
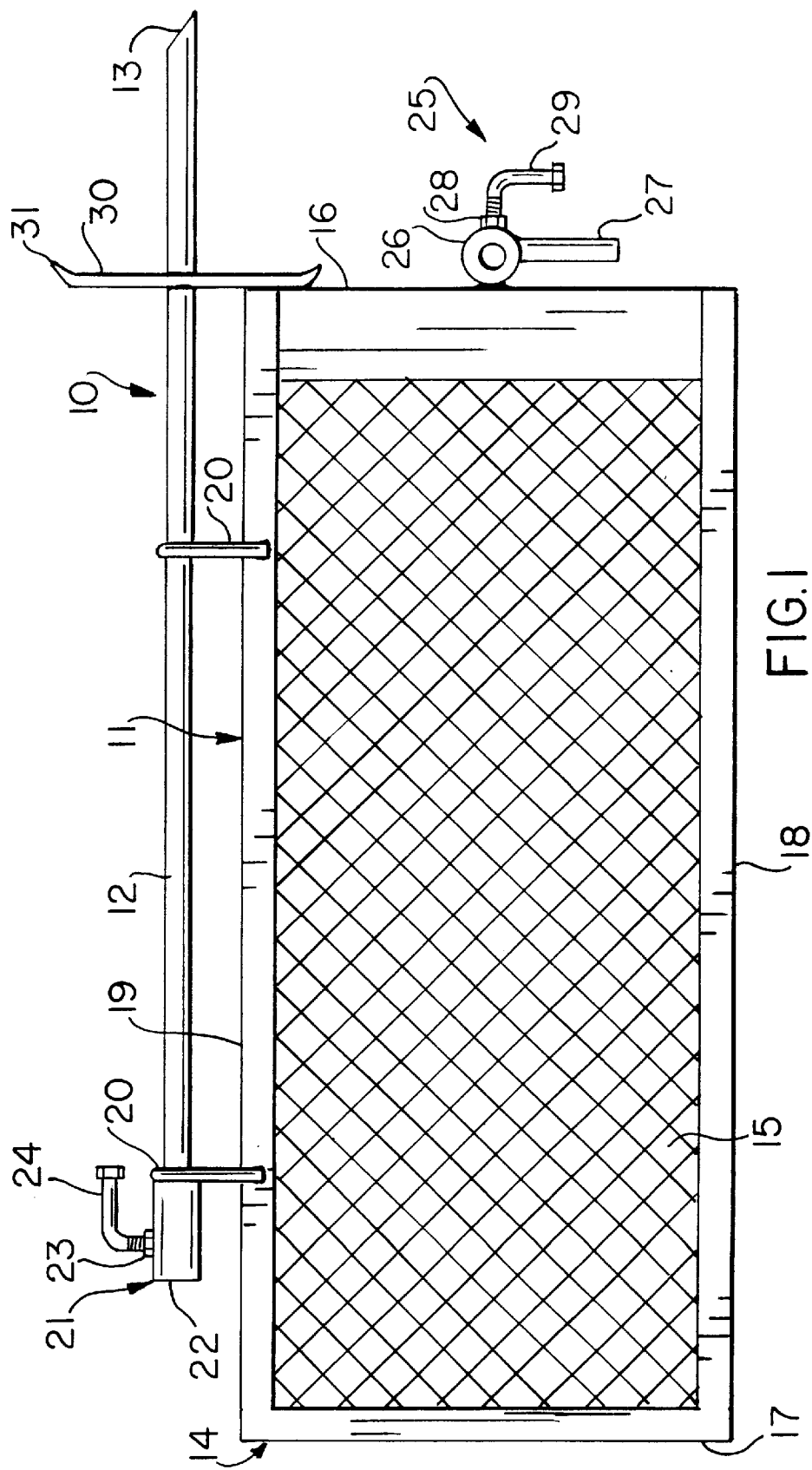
FIG. 1 is a top plan view of the portable grill assembly according to the present invention shown assembled for ease of carrying.

With regard to FIG. 1, the preferred embodiment of the portable campfire grill as assembled for carrying is shown at numeral 10. Grill 11 is a generally planar metal structure having a frame 14, a interior metal mesh, expanded metal or other metal screen 15 for supporting food to be cooked includes an inside bar 16, and outside bar 17, and two side bars 18 and 19 all formed of conventional angle iron. A pair of spaced fasteners in the form of hook members 20 are sized to accept cylindrical support post 12 which has a lower end portion terminating in a sharp point 13 which fits into the ground. A vertical height adjustment assembly 21 is shown used to secure the post 12 against movement. Tubular sleeve 22 has a nut 23 welded thereon and engaging set screw 24 fits into nut 23 and extends through the body of sleeve 22 to engage the post 12 as understood in the art.

The lower portion of the support post 12 includes a welded flange 30 that functions to stabilize the post 12. In FIG. 1, the post 12 is positioned in hook members 20 and moved to the left to put flange 30 against bar 16 and engaging set screw 24 is tightened to secure the post 12 into the position shown. The space between bar 19 and post 12 is sufficient to allow a user to grasp the post 12 for carrying the grill assembly 10 when assembled as shown.

The assembly for horizontal adjustment of position of the grill around the post 12 when the grill assembly is in operation is shown at 25. A tubular sleeve 26 is welded to bar 16 and includes a nut 28 and engaging set screw 29 that fits into the nut 28 and through the body of sleeve 26 to engage the post 12 when inserted into the sleeve 26 as understood in the art. Laterally extending handle 27 is welded to sleeve 26 and provides a means for a user to rotate the grill 11.

Figure 2:
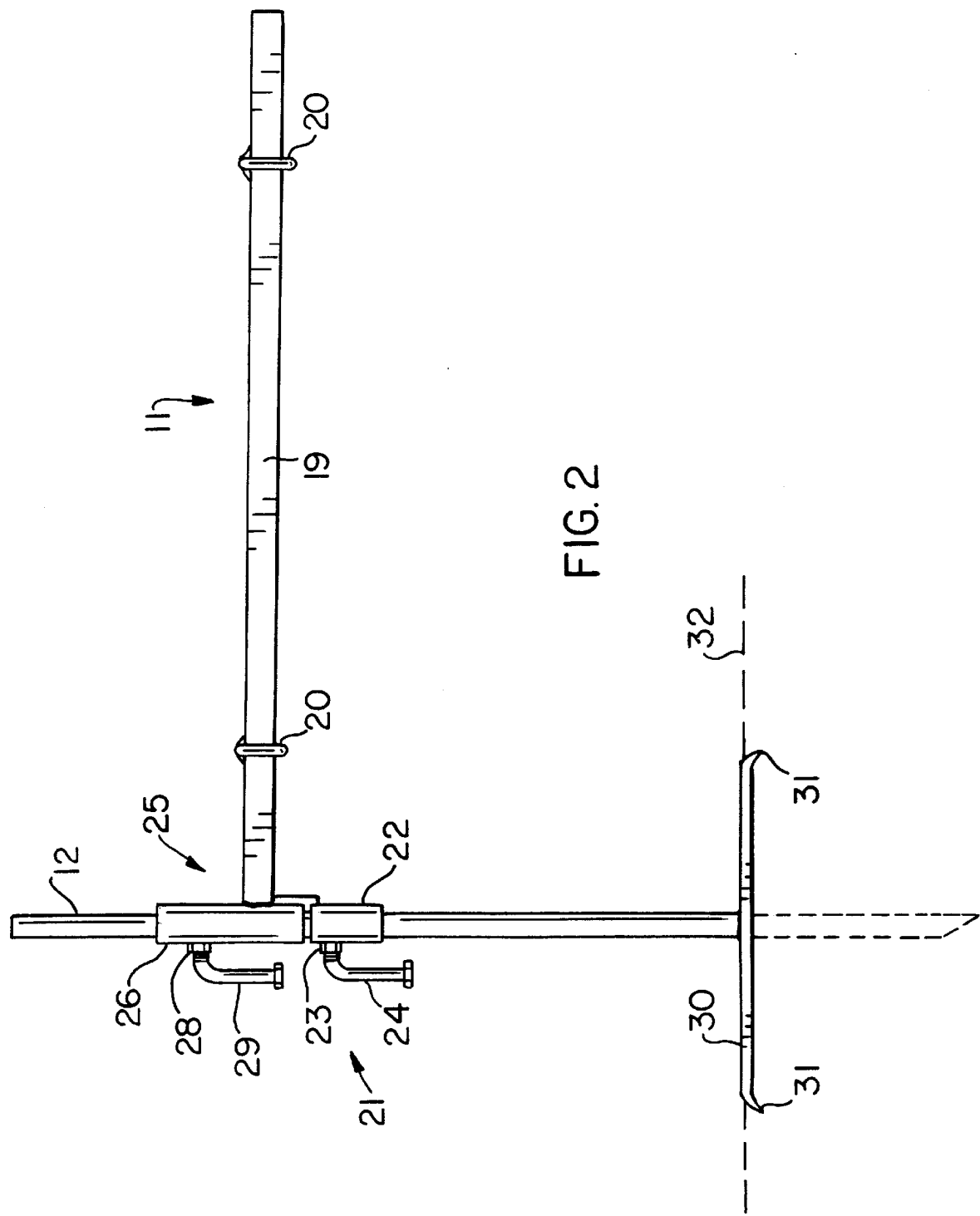
FIG. 2 is a side elevation of the grill of FIG. 1 assembled for use.

In FIG. 2, the grill assembly 10 is shown as assembled for use with a campfire (not shown). The assembly 10 is originally assembled as shown in FIG. 1. The assembly 10 turned vertically to allow post 12 to be driven into the ground 32 by pushing on the flange 30 with the foot of a user. At this time vertical adjustment assembly 21 is removed from the upper portion of the post 12. The grill 11 is then removed from the post 12 by a vertical lift. The assembly 21 is put down over post 12 and secured into place at the desired height. Grill 11 is then placed over post 12 by guiding sleeve 26 over the post 12. Sleeve 26 will then rest on sleeve 22 as clearly shown in FIG. 2. The sleeve 26 and the grill 11 attached thereto can then be rotated around post 12 to any desired position and secured into place via screw 29 that was loosened to allow for rotation. Down-turned corners 31 on flange 30 provide additional lateral stability for the assembled grill 10 and inhibit rotation of the post 12.

If desired, the mounting of the post 12 may be reversed in direction from the mounting shown in FIG. 1, such that flange 30 is adjacent outside bar 17 of frame 14. This arrangement prevents the apparatus of horizontal adjustment assembly 25 from being forced against the ground when setting up the grill assembly. In addition the weight of frame 14 being against flange 30 provides momentum to the forcible insertion of the end 13 of post 12 into the ground and thus requires a shorter time to apply foot pressure to fully engage the ground with flange 30. After removal of the grill 11 the vertical adjustment assembly 21 is reinstalled on post 12 below the horizontal adjustment assembly 25 as illustrated in FIGS. 2 and 3.

Figure 3:
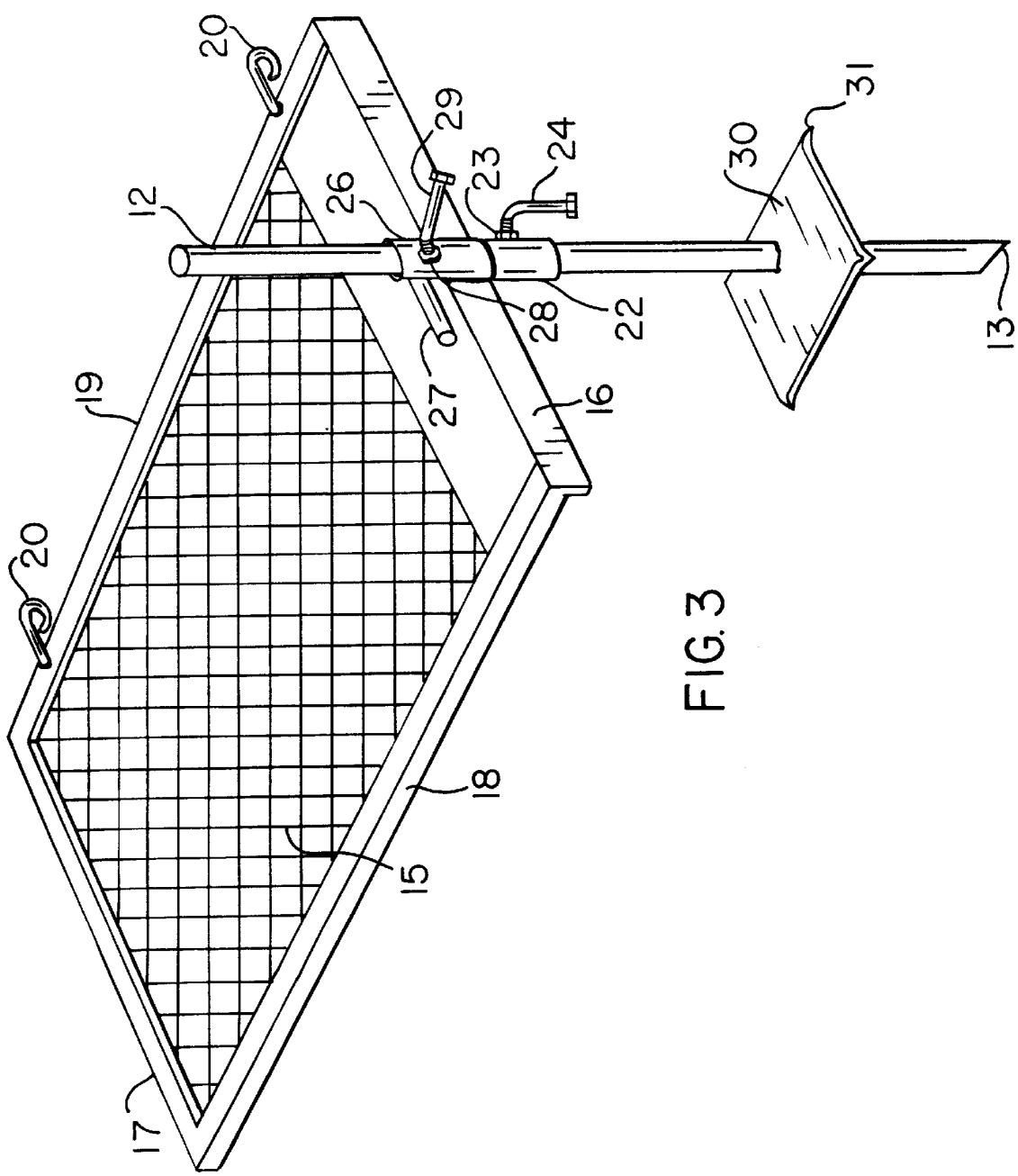
FIG. 3 is a perspective view of the grill of FIG. 2.

FIG. 3 illustrates a perspective view of the grill assembly 10 assembled for use in cooking.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A portable campfire grill assembly comprising a support post having a first end and a second end portion, said first end portion being adapted to be inserted into the ground in a vertical manner with said second end portion being uppermost, a first sleeve member having a tubular body including an upper and lower end portion sized to slide over said second end portion of said support post, first engaging means mounted through said tubular body for selectively engaging said support post for fixing the position of said first sleeve member on said support post, a second sleeve member having a tubular body including an upper and lower end portion being sized to slide over said second end portion of said support post and to support said first sleeve member when resting thereon, second engaging means mounted through said tubular body of said second sleeve member for selectively engaging said support post for fixing the vertical position of said second sleeve member on said support post and said first sleeve member when said first sleeve member is resting on said second sleeve member, a grill member affixed to said first sleeve member to dispose said grill member horizontally with respect to ground, and means affixed to said grill member for releasable mounting of said support post, said support post being grippable to carry said assembly when said support post is mounted to said means affixed to said grill member, said means affixed to said grill member including a pair of spaced fasteners mounted to said grill member and located in the same horizontal plane as said grill member, each said fastener being formed to fit around said support post.

2. The grill assembly as defined in claim 1 wherein each said fastener includes a substantially closed hook member defining an interior generally circular passageway, said support post being cylindrical and removably insertable into said passageway of each said hook member.

3. The grill assembly as defined in claim 1 further including a generally planar support flange affixed to said support post adjacent said lower end portion for resting against the ground and laterally supporting said support post in a vertical position.

4. The grill assembly as defined in claim 3 wherein said flange is formed of a substantially square metal plate having four corners, each said corner being turned downwardly in the direction of said first end portion of said support post to penetrate the surface of ground when said support post is vertically mounted to provide for lateral support of said support post and inhibit rotation of said support post.

5. The grill assembly as defined in claim 1 wherein said grill member is substantially planar and rectangular in shape and includes two metal end bars and two metal side bars enclosing a metal screen, one said end bar being welded to said first sleeve member.

6. The grill assembly as defined in claim 5 wherein said pair fasteners includes a pair of spaced metal loop members affixed to one said side bar to locate said loop members in the same horizontal plane as said grill member.

7. The grill assembly as defined in claim 1 wherein said first sleeve member is located to rest on said upper end portion of said second sleeve member and being rotatable thereupon after release of said first engaging means from said support post.

8. The grill assembly as defined in claim 7 further including a laterally extending handle affixed to the body of said first sleeve member to assist a user in rotating said first sleeve member for selective rotation of said grill member about said support post.

9. A portable campfire grill assembly comprising a support post having a first end and a second end portion, said first end portion being adapted to be inserted into the ground in a vertical manner with said second end portion being uppermost, a first sleeve member having a tubular body including an upper and lower end portion sized to slide over said second end portion of said support post, first engaging means mounted through said tubular body for selectively engaging said support post for fixing the position of said first sleeve member on said support post, a second sleeve member having a tubular body including an upper and lower end portion being sized to slide over said second end portion of said support post and to support said first sleeve member when resting thereon, second engaging means mounted through said tubular body of said second sleeve member for selectively engaging said support post for fixing the vertical position of said second sleeve member on said support post and said first sleeve member when said first sleeve member is resting on said second sleeve member, a grill member affixed to said first sleeve member to dispose said grill member horizontally with respect to ground, and means affixed to said grill member for releasable mounting of said support post, said support post being grippable to carry said assembly when said support post is mounted to said means affixed to said grill member, wherein said grill member is substantially planar and rectangular in shape and includes two metal end bars and two metal side bars enclosing a metal screen, one said end bar being welded to said first sleeve member, said means including a pair of spaced metal loop members affixed to one said side bar to locate said loop members in the same horizontal plane as said grill member.

10. A portable campfire grill assembly comprising a support post having a first end and a second end portion, said first end portion being adapted to be inserted into the ground in a vertical manner with said second end portion being uppermost, a first sleeve member having a tubular body including an upper and lower end portion sized to slide over said second end portion of said support post, first engaging means mounted through said tubular body for selectively engaging said support post for fixing the horizontal position of said first sleeve member on said support post, a second removable sleeve member having a tubular body including an upper and lower end portion sized to slide over said second end portion of said support post and positioned on said post below said first sleeve member, second engaging means mounted through said tubular body of said second sleeve member for selectively engaging said support post for fixing the vertical position of said second sleeve member on said support post, said first sleeve member resting on said upper end portion of said second sleeve member and being rotatable about said support post upon release of said first engaging means, each said sleeve member being removable from said support post, a planar grill member permanently affixed to said first sleeve member, and carrying means affixed to said first sleeve member, and carrying means affixed to said grill member for carrying said support post when said support post has been removed from said first sleeve member, said carrying means including a pair of spaced fasteners mounted to said grill member to be located in the same plane as said grill member, each said fastener being formed to fit around said support post.

11. The grill assembly as defined in claim 10 wherein each said fastener includes a substantially closed hook member including a rod element and a hook element at one end of said rod element, said hook element defining an interior generally circular passageway, said support post being removably insertable into said passageway of each said hook member, said rod element having length sufficient to provide a space between said support post when carried by said hook members and said grill member for fingers of a user carrying said grill assembly.

12. The grill assembly as defined in claim 10 further including a generally planar support flange affixed to said support post adjacent said lower end portion for resting against the ground and laterally supporting said support post in a vertical position.

13. The grill assembly as defined in claim 12 wherein said flange is a substantially square metal plate having four corners, each said corner being turned downwardly in the direction of said first end portion of said support post to penetrate the surface of the ground when said support post is vertically mounted to provide for lateral support of said support post and to inhibit rotary movement of said support post.

14. The grill assembly as defined in claim 10 wherein said grill member is substantially planar and rectangular in shape and includes two metal end bars and two metal side bars enclosing a metal screen, one said end bar being welded to said first sleeve member.

15. The grill assembly as defined in claim 14 wherein said carrying means includes a pair of spaced metal loop members affixed to one said side bar to locate said loop members in the same horizontal plane as said grill member.

16. The grill assembly as defined in claim 10 wherein said first sleeve member is located to rest on said upper end portion of said second sleeve member and rotatable thereupon upon release of said first engaging means.

17. The grill assembly as defined in claim 16 further including a laterally extending handle affixed to the body of said first sleeve member to assist a user in rotating said first sleeve member for selective positioning of said grill member about said support post.

18. A portable campfire grill assembly comprising a support post having a first end and a second end portion, said first end portion being adapted to be inserted into the ground in a vertical manner with said second end portion being uppermost, a first sleeve member having a tubular body including an upper and lower end portion sized to slide over said second end portion of said support post, first engaging means mounted through said tubular body for selectively engaging said support post for fixing the position of said first sleeve member on said support post, a second sleeve member having a tubular body including an upper and lower end portion being sized to slide over said second end portion of said support post, second engaging means mounted through said tubular body of said second sleeve member for selectively engaging said support post for fixing the vertical position of said second sleeve member on said support post, a grill member affixed to said first sleeve member to dispose said grill member horizontally with respect to ground, said first sleeve member being located to rest on said upper end portion of said second sleeve member and rotatable thereupon after release of said first engaging means from said support post, and further including means affixed to said grill member for releasably mounting said support post, said support post being grippable by a user for carrying said grill assembly, said means affixed to said grill member being located in the same plane as said grill member.

* * * * *